No. 752,069. PATENTED FEB. 16, 1904.
C. J. HANFBAUER.
ATTACHMENT FOR MACHINES FOR PERFORATING STRIPS.
APPLICATION FILED MAY 20, 1902.
NO MODEL. 5 SHEETS—SHEET 1.
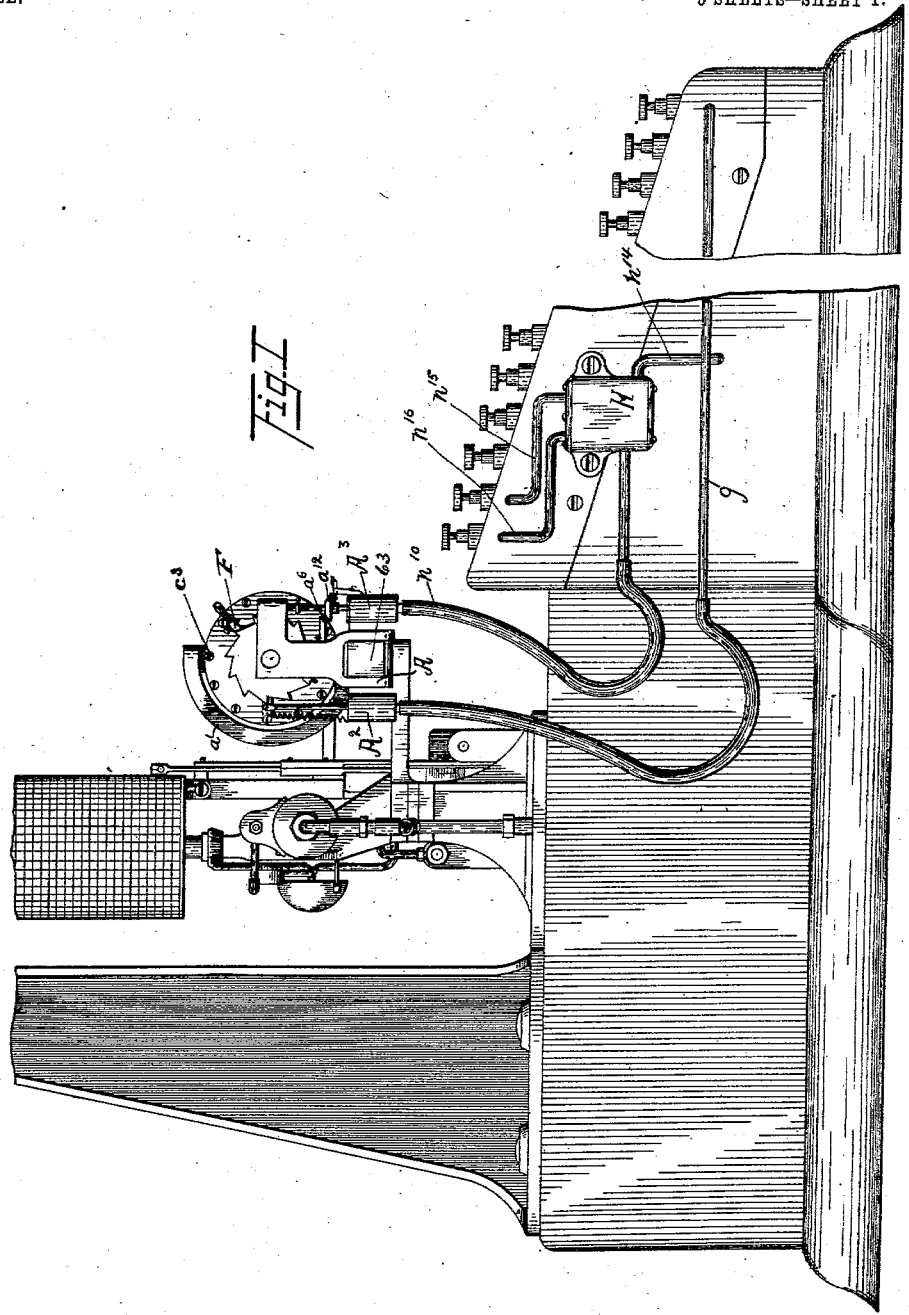

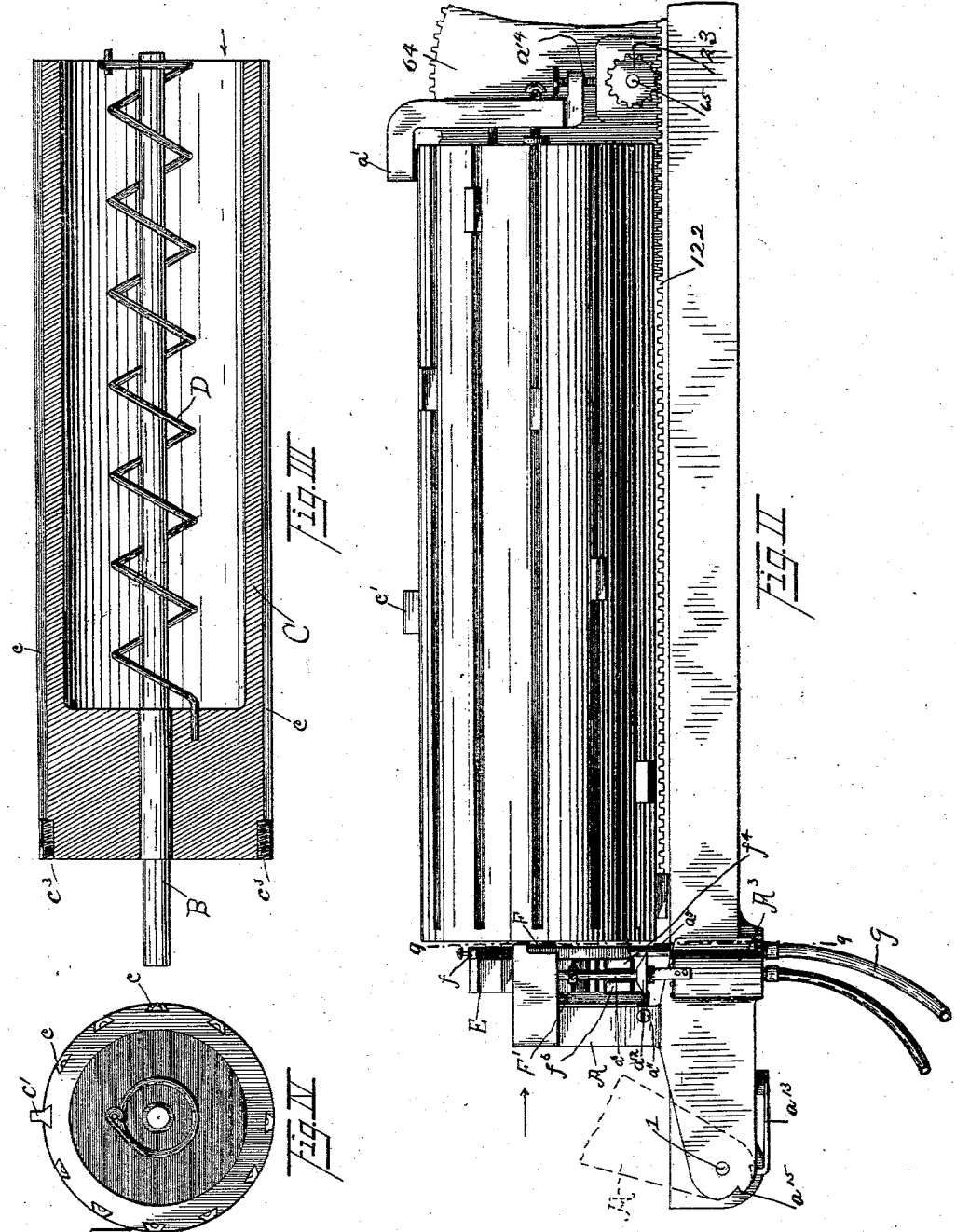

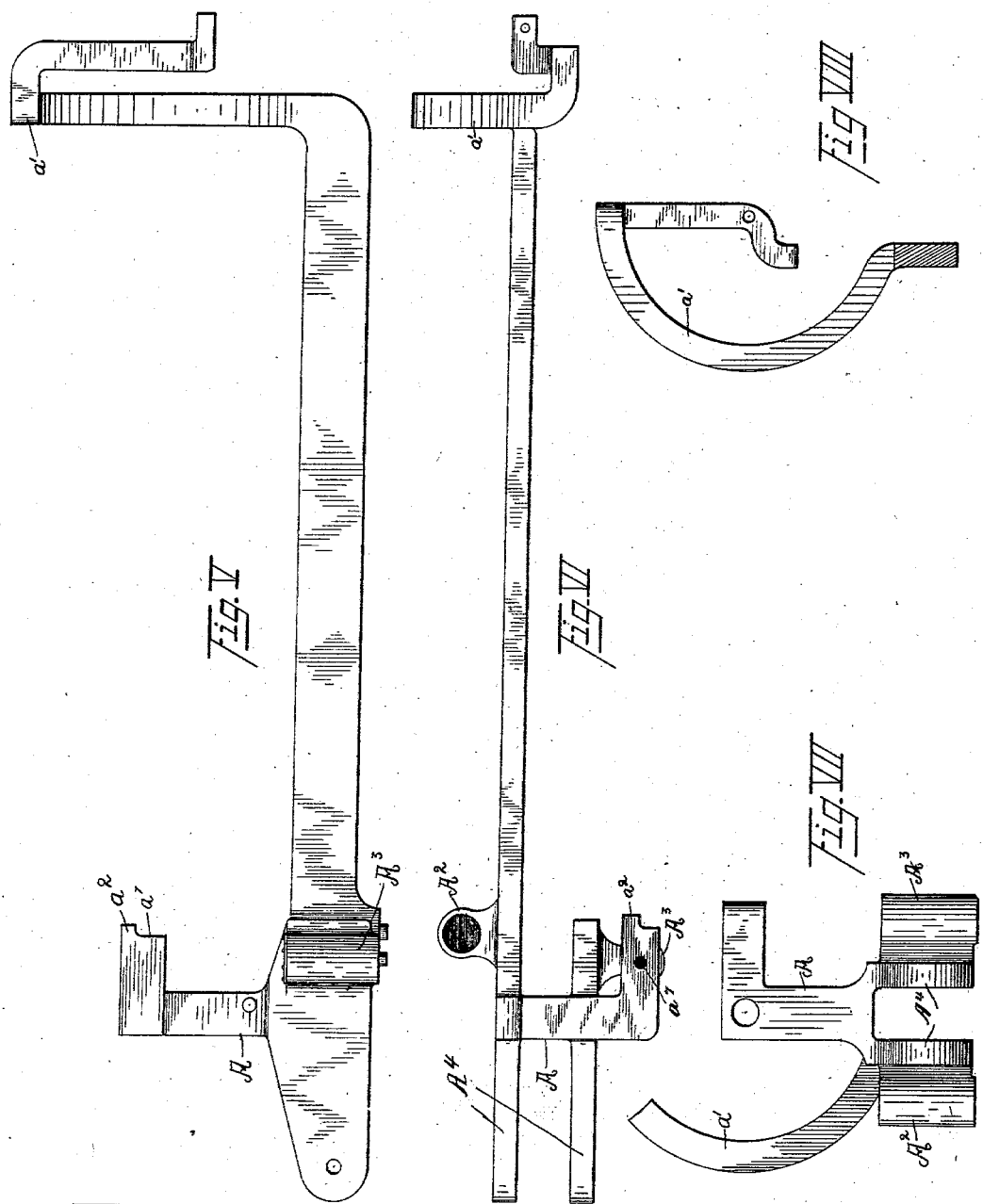

No. 752,069. PATENTED FEB. 16, 1904.
C. J. HANFBAUER.
ATTACHMENT FOR MACHINES FOR PERFORATING STRIPS.
APPLICATION FILED MAY 20, 1902.
NO MODEL. 5 SHEETS—SHEET 4.
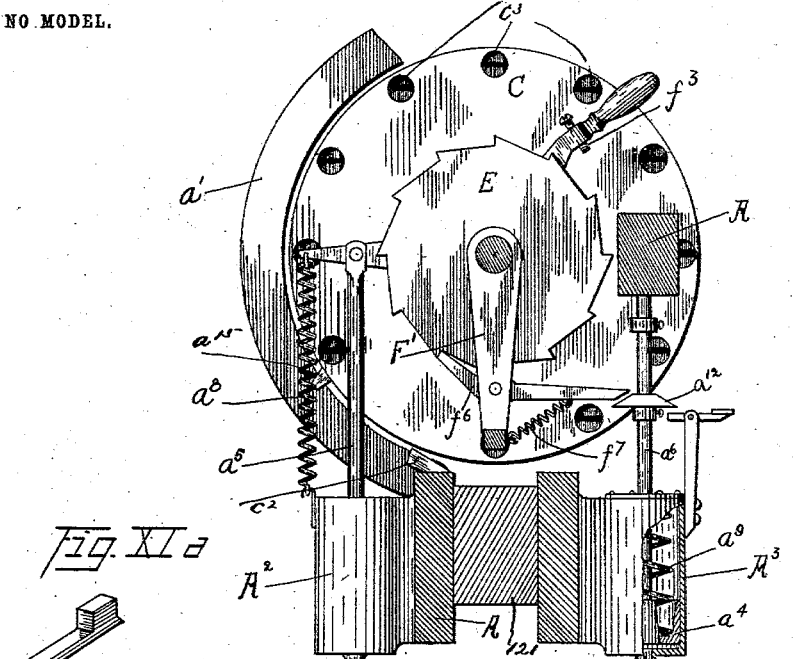
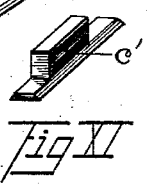
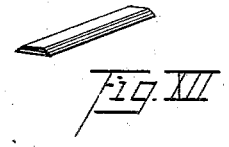
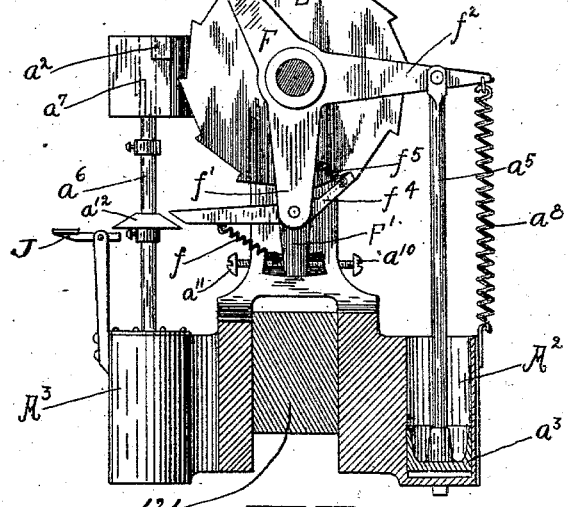
Witnesses:
Wm H Spire
D. T. Davies
Inventor.
C. J. Hanfbauer,
by J. B. Jay, Atty.

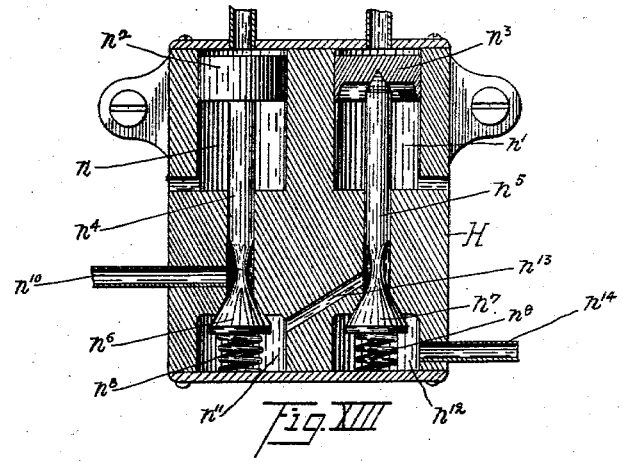
Fig. XIII
Fig. XV
Fig. XVI
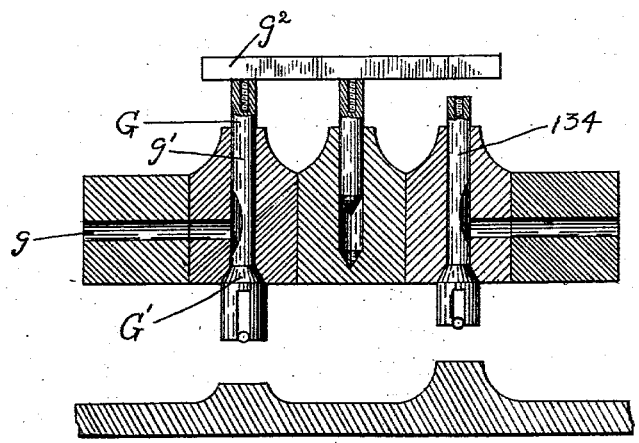
Fig. XIV

No. 752,069. Patented February 16, 1904.

UNITED STATES PATENT OFFICE.

CHARLES J. HANFBAUER, OF CLEVELAND, OHIO.

ATTACHMENT FOR MACHINES FOR PERFORATING STRIPS.

SPECIFICATION forming part of Letters Patent No. 752,069, dated February 16, 1904.

Application filed May 20, 1902. Serial No. 108,252. (No model.)

*To all whom it may concern:*

Be it known that I, CHARLES J. HANFBAUER, a citizen of the United States, and a resident of Cleveland, county of Cuyahoga, and State of Ohio, have invented a new and useful Improvement in Attachments for Machines for Perforating Strips, of which the following is a specification, the principle of the invention being herein explained and the best mode in which I have contemplated applying that principle, so as to distinguish it from other inventions.

My invention relates to machines for perforating strips, such as that shown and described in United States Patent No. 654,115, issued July 17, 1900, to Tolbert Lanston, and similar machines in which a movable line-indicating member having a retrograde movement is employed, The invention relates particularly to means for automatically and variably limiting the retrograde movement of said indicating member, the object of such invention being an increase in the facility of operation of such strip-perforating machine.

Said invention consists of means hereinafter fully described, and specifically set forth in the claims.

The annexed drawings and the following description set forth in detail certain mechanism embodying the invention, such disclosed means constituting but one of various mechanical forms in which the principle of the invention may be used.

In said annexed drawings, Figure I represents a side elevation of a Lanston strip-perforating machine embodying my invention. Fig. II represents an enlarged detail front view of a part of my invention, showing also adjacent parts of said perforating-machine. Fig. III represents an axial section of a cylinder employed and forming part of my invention, and Fig. IV represents an end view of same looking in the direction indicated by the arrow in Fig. III. Figs. V and VI represent front elevation and top plan views, respectively, of the frame for supporting said cylinder; and Figs. VII and VIII represent an end view and vertical section of said frame, respectively. Fig. IX represents an enlarged vertical section taken upon the plane indicated by the line 9 9 in Fig. II. Fig. X represents a transverse section taken on the plane indicated by the said line 9 9 looking in the direction opposite from that indicated by said arrow. Figs. XI and XII represent, respectively, a detail perspective view of an adjustable lug and a lug spacer or strip used in connection with my said invention. Fig. XIII represents a vertical sectional view of a casing, pistons, cylinders, and valves for controlling the operation of my invention. Fig. XIV represents a vertical section of a portion of the keyboard and pressure-chamber of said strip-perforating machine, in which is seated the restoring key and valve and an auxiliary key and valve instrumental in controlling the operation of my said invention. Figs. XV and XVI represent vertical sections of buttons which may be used on the finger-keys, illustrating in part a modified method for carrying the operation of my said invention.

In the following description the numerals used are those used in the above-named patent and used for designating the parts which are the same in function as those hereinafter referred to by such numerals.

Extending across the machine in front of the units-wheel 64 is a guide or track (not shown) supported by the frame 63, Fig. I, and having upon its front side a line-scale (also not shown) for indicating the space remaining unfilled by characters in a line or indicating the length of the line already set, as will be understood from the description of the "line-indicator," page 10, of the above-named patent. Sliding in this track is a line-rack-bar 122, Fig. II, which meshes with a pinion 123 on the front end of the units-wheel shaft 65, whereby, it will be seen, the said rack-bar will move in accordance with either direction of motion of the units-wheel 64. An indicating-finger (not shown) is suitably mounted upon the frame and coöperates with the scale in indicating the length of the line, as will be readily understood. It will hence be seen that the length of the line may be regulated by limiting the retrograde movement of the rack-bar 122, and the means employed in the machine described and shown in the above-named patent consists of a stop, which is fixed upon a conveniently-located stationary portion of the machine, such stop being, however, manually adjustable to assume various positions. Such variation of said stop is, however, only effected by hand, and is hence accomplished in a comparatively slow and cumbersome manner. When it is desired to set columns of type of different width adjacent to each other, it would be necessary to change the position of the stop by hand as many times as there are columns while performing the operation required for a single line. By my invention, however, such means for variably determining the extent of retrograde movement of the line rack-bar is actuated automatically and controlled by the mechanism itself, as will further appear.

The track 121, supporting and guiding the line rack-bar 122, is provided with a frame A, having arms $a$ and $a'$, which are formed with supports for a shaft B, upon which is secured a cylinder C. This cylinder is provided with a series of equidistant longitudinally-located undercut grooves $c$, Fig. IV, in each of which is located a removable lug $c'$, having a base portion fitting the groove, and which projects from the cylinder-surface radially with reference to the cylinder-axis and may be shifted along the groove into various longitudinal positions. These lugs are held and their longitudinal positions secured by means of sectional strips or spacers, one section of which is illustrated in Fig. XII. These sections are caused to fit the grooves snugly, so as to hold the lugs quite securely against longitudinal displacement. It is thus seen that a variety of secure positions of each lug may be obtained by removing a section of the corresponding strip from one end of its groove, moving the whole line, including the lug, along. These grooves are preferably closed at one end, as shown in Fig. III, each such end being provided with an adjusting abutment-screw $c^3$, whereby the line of spacers, including the projecting lug, may be moved and adjusted by fractional parts of spacer lengths. Said cylinder is made hollow, Fig. III, and in its interior around the shaft B is placed a helical spring D, one end of which is secured to the cylinder and the other end of which is secured to the frame A, as shown in said Figs. II and III.

A stop $a^{15}$ is secured to the frame, Fig. IX, and is located in the path of movement of a stop-lug $c^2$, secured to the cylinder C, and preferably upon that side of the frame nearest the lug $c^2$, in the direction opposite that in which the spring D when torsional tension tends to rotate said cylinder. Upon said shaft and adjacent to one end of the cylinder is secured a ratchet-wheel E, Figs. II and IX, and mounted upon said shaft intermediately of said wheel and cylinder is an oscillatory member F, having three arms $f$, $f'$ and $f^2$, Fig. X. The one arm, $f$, is provided with a stop-screw $f^3$, adapted to engage an extention $a^2$, formed on the frame A and to limit the oscillatory movement of said member. The arm $f'$ carries a pawl $f^4$, which engages the ratchet-wheel, said engagement being maintained by a spring $f^5$, attached at one end to the arm $f'$ and at the other to the pawl, as shown in Fig. X. The third arm is secured to a piston-rod operated by a piston in a pressure-cylinder, as will hereinafter be fully described. Upon said shaft and adjacent to the opposite side of the ratchet-wheel is fixed a downwardly-extending arm F', upon which is mounted a pawl $f^6$, also engaging the ratchet-wheel E, as shown in Fig. IX, engagement being maintained by means of a spring $f^7$, whose ends are respectively secured to the pawl and arm. It will hence be observed that there are two pawls $f^4$ and $f^6$, which simultaneously engage the ratchet-wheel, one of which, $f^4$, is mounted upon an oscillatory and the other of which, $f^6$, is mounted upon a fixed support, the two pawls being located side by side.

In the frame A and below the vicinity of the ratchet-wheel are formed two pressure-cylinders $A^2$ and $A^3$, Figs. IX and X, each of which is provided with a piston $a^3$ and $a^4$ and piston-rods $a^5$ and $a^6$, respectively, and suitable inlets whereby fluid-pressure may be admitted below the pistons and the latter moved upwardly. Piston-rod $a^5$ is connected with arm $f^2$, and the upper end of piston-rod $a^6$ enters a bore $a^7$ in the frame, Fig. VI, which acts as a guide in its upward movement. The normal position—that is, that position in which the pistons occupy their lowermost positions—is maintained by springs $a^8$ and $a^9$, respectively.

The number of teeth in the ratchet-wheel is equal with the number of grooves in the cylinder plus one, and said teeth and the pawls when in engagement are located so as to cause one of the grooves to occupy a position such that a lug located therein is caused to intersect the path of retrograde movement of the rack-bar 122, excepting when lugs $c^2$ and stop $a^{15}$ are in engagement. In order to adjust the cylinder so as to obtain its position exactly, two adjusting-screws $a^{10}$ and $a^{11}$ are provided in the frame and engage opposite sides of the arm F', whereby the latter may be fixed within limits in various angular positions.

In addition to the "return finger-piece" 134, more commonly called the "restoring-key," the keyboard is provided with an additional key G, Fig. XIV, which operates in connection with said key 134, as will be described. Such key G operates a valve G', controlling the communication of a duct $g$, which is connected with the pressure-cylinder $A^2$, as shown in Figs. I and II. The valve-stem $g'$ of said valve G' is made somewhat longer than the stem of the valve operated by the restoring-key 134, and the finger-piece $g^2$ is made of a length such as to extend over the said key 134, as shown in Fig. XIV, whereby it is seen that pressure is admitted into the duct $g$ and the piston $a^3$ actuated prior to the inauguration of the retrograde movement of the rack-bar 122, which is controlled by the key 134.

At the side of the keyboard-frame, Fig. I, is secured a piston-casing H, in which are formed two pressure-cylinders $h$ and $h'$, containing pistons $h^2$ and $h^3$, mounted or resting upon valve-stems $h^4$ and $h^5$, carrying at their lower ends valves $h^6$ and $h^7$. These valves are caused to normally contact their respective seats by means of springs $h^8$ and $h^9$. Valve $n^6$ controls communication between a duct $h^{10}$ and a chamber $h^{11}$, and valve $h^7$ controls communication between chamber $h^{11}$ and a chamber $h^{12}$, connected therewith through the medium of a passage $h^{13}$, Fig. XIII. Chamber $h^{12}$ is connected with the pressure-supply by means of a duct $h^{14}$, Fig. I. The two pressure-cylinders $h$ and $h'$ are connected with the justification-keys, which in the Lanston device are the two uppermost rows of keys, by means of suitable ducts $h^{15}$ and $h^{16}$ in a manner such that the simultaneous depression of two justification-keys respectively located in different rows will effect the simultaneous depression of pistons $h^2$ and $h^3$ and the consequent opening of duct $h^{10}$ to the pressure-supply. Duct $h^{10}$ is connected, as shown in Fig. I, with the pressure-cylinder $A^3$, so that the admission of fluid-pressure under piston $a^4$ effects the upward movement of stem $a^4$. The stem is provided with a knock-off piece $a^{12}$, which is adapted on such upward movement of said stem to engage and knock pawls $f^4$ and $f^6$ out of engagement with ratchet-wheel E.

The frame A is preferably formed with a yoke $A^4$, adapted to straddle the track and hinged thereto, as at the point 1, Fig. II. Such yoke may be formed with a shoulder $a^{15}$ and the track provided with a spring-latch $a^{13}$, secured to its lower surface, whereby the frame and its attached parts may be secured in an elevated and hence inoperative position, as indicated in dotted lines in said Fig. II. The lower end of the arm $a'$ is preferably provided with an adjusting-screw $a^{14}$, adapted to rest upon conveniently adjacent portion of the machine whereby the angular position of the frame and hence the cylinder C may be nicely adjusted.

In the following description of the operation of the above-described mechanism it will be assumed that the cylinder C is at the beginning resting at the zero-point—that is, in that position in which stop-lugs $c^2$ and stop $a^{15}$ are in engagement—and that as many of the lugs $c'$ as are required have been adjusted longitudinally in their respective grooves in order that their right-hand ends, as viewed in Fig. II, may occupy successive planes in which it is desired to arrest the abutting end of the rack-bar in its retrograde movement, and thereby determine varying lengths of lines to be set. Now assuming that the keyboard has been operated to perforate the strip as required and that the rack-bar has been by such action moved to the right to a position corresponding with the end of the line and that the perforation for controlling the justifying and galley mechanisms in the casting device used in the Lanston system have been made, let it be required to restore the mechanism and begin the perforating operation for a new line. While it has been assumed that the cylinder is at the zero-point during this described state and relation of parts, it may now be stated that such is always, as will hereinafter appear, the position at such time and during such state and relation of parts.

To "restore" the mechanism, then, the restoring-key is depressed, whereby, as will be seen from the foregoing description, the piston $a^3$ is actuated upwardly and the cylinder rotated through an angular distance equal to that between two succeeding teeth. This action brings the projecting lug in the first groove into the path of the abutting end of the rack-bar and is immediately followed by the retrograde movement of such bar. The latter, finding its path intercepted, is arrested by such lug, which, as before noted, is set to effect such arrest in the proper plane. The keyboard now being manipulated until the first line of the first column is completed, the justifying-keys are operated separately, such action, however, having no effect upon the piston $a^4$, since to submit it to the fluid-pressure two justifying-keys, one in each row, must be depressed simultaneously. The mechanism is now again restored, so as to bring the parts into proper position for beginning the first line of the second column. Such act, as before, rotates the cylinder C so as to bring the projecting lug in the next groove into the path of retrograde movement of the rack-bar, such retrograde movement, as before, immediately following, and this bar is arrested in the required position. The keyboard is now manipulated to effect the perforation for the said line in the second column, after which the mechanism is again restored, bringing the next projecting lug into position. The above-described series of operations are repeated until all the perforations for the first lines of the columns are made. On completion of the perforations for the last line first one justification-key is depressed and then two adjacent keys, one in each row, are depressed. Such action opens the duct $h^{10}$ to communication with the pressure-supply, as will be understood from the foregoing description, thereby actuating piston $a^4$ and piston-rod $a^6$ upwardly. Such movement knocks out the pawls $f^4$ and $f^6$, thus releasing the ratchet-wheel E and cylinder C, the latter being thereupon returned to the zero position by the spring D. The restoring-key now being depressed, the perforations for the second lines of the series of columns are now made and the operation above described repeated.

In addition to the mechanism above described I prefer to add elements whereby the operation of manipulating the cylinder C, as above set forth, may be effected independently of the keys on the keyboard. To this end I provide the arm $f$ of the member F with a handle $f^8$, which may be used to manually oscillate member F, and so rotate the cylinder step by step, as above described. A lever J is also provided, which is adapted to be manually operated to engage the knock-off piece on piston-rod $a^6$, and so permit the cylinder to return to the zero-point.

Other modes of applying the principle of my invention may be employed instead of the one explained, change being made as regards the mechanism herein disclosed provided the means stated by any one of the following claims or the equivalent of such stated means be employed.

I therefore particularly point out and distinctly claim as my invention—

1. In a machine for perforating strips, the combination of line-indicating means embodying a movable part adapted to have a retrograde movement, means for variably determining the extent of such movement, and means for actuating said determining means.

2. In a machine for perforating strips, the combination of line-indicating means embodying a movable part adapted to have a retrograde movement, means for variably determining the extent of such movement, means for actuating such determining means, and manually-controlled means for controlling such actuating means.

3. In a machine for perforating strips, the combination of line-indicating means embodying a movable part adapted to have a retrograde movement, means for determining the extent of such movement and means for simultaneously actuating said indicating means to retrogress and for actuating said determining means.

4. In a machine for perforating strips, the combination of line-indicating means embodying a movable part adapted to have a retrograde movement, means for variably determining the extent of such movement and means for simultaneously actuating said indicating means to retrogress and for actuating said determining means.

5. In a machine for perforating strips, the combination with line-indicating means embodying a movable part adapted to have a retrograde movement, of mechanism for interposing in the path of such part at successive points, means for limiting the extent of such retrograde movement.

6. In a machine for perforating strips, the combination of line-indicating means embodying a movable part adapted to have a retrograde movement, mechanism for interposing in the path of such part at successive points, means for limiting the extent of such retrograde movement, and manually-controlled means for controlling such mechanism.

7. In a machine for perforating strips, the combination of line-indicating means embodying a movable part adapted to have a retrograde movement, mechanism for interposing in the path of such part at successive points means for limiting the extent of such retrograde movement, and means for effecting the operation of said mechanism and the retrogression of such movable part simultaneously.

8. In a machine for perforating strips, the combination of line-indicating means embodying a movable part adapted to have a retrograde movement, means for effecting such movement including a key, and means for variably determining the extent of such movement and controlled by said key.

9. In a machine for perforating strips, the combination of line-indicating means embodying a movable part adapted to have a retrograde movement, restoring means for effecting such movement including a key, and means for variably determining the extent of such movement and controlled by said key, the latter being adapted to effect the inauguration of the operation of the determining means prior to the inauguration of the operation of the restoring means.

10. In a machine for perforating strips, the combination of line-indicating means embodying a movable part adapted to have a retrograde movement, restoring means for effecting such movement including a key, means controlled by said key for variably determining the extent of such movement, and means for returning such determining means to a constant initial position.

11. In a machine for perforating strips, the combination of line-indicating means embodying a movable part adapted to have a retrograde movement, restoring means for effecting such movement, means for variably determining the extent of such movement and operable in connection with said restoring means, a key for controlling the mechanism for designating the perforation adapted to inaugurate the movement of the galley mechanism, and means for returning such determining means to a constant initial position and controlled by said designating-mechanism key.

12. In a machine for perforating strips, the combination of line-indicating means embodying a movable part adapted to have a retrograde movement, restoring means for effecting such movement including a key, means controlled by said key for variably determining the extent of such movement, means for returning such determining means to a constant initial position, and means for controlling said returning means, such latter means adapted to control the mechanism for designating the perforations adapted to inaugurate the movement of the galley mechanism.

13. In a machine for perforating strips and embodying movable line-indicating means adapted to have a retrograde movement, the combination with a rotatable cylinder provided with projections extending radially with reference to the cylinder-axis, of means for imparting to said cylinder an intermittent rotating movement, whereby said projections may be successively interposed in the path of retrogression of said indicating means.

14. In a machine for perforating strips and embodying movable line-indicating means adapted to have a retrograde movement, the combination with a rotatable cylinder provided with longitudinally-adjustable projections extending radially with reference to the cylinder-axis, of means for imparting to said cylinder an intermittent rotating movement whereby said projections may be successively interposed in the path of retrogression of said indicating means.

15. In a machine for perforating strips and embodying movable line-indicating means adapted to have a retrograde movement and restoring means including a key adapted to effect such movement, the combination with a rotatable cylinder provided with projections extending radially with reference to the cylinder-axis, of means for imparting to said cylinder an intermittent rotating movement whereby said projections may be successively interposed in the path of retrogression of said indicating means, said rotating means being controlled by the restoring-key of such machine.

Signed by me this 10th day of May, 1902.

C. J. HANFBAUER.

Attest:
 D. G. DAVIES,
 A. E. MERKEL.